United States Patent
Wells

(10) Patent No.: US 7,305,127 B2
(45) Date of Patent: Dec. 4, 2007

(54) DETECTION AND MANIPULATION OF SHADOWS IN AN IMAGE OR SERIES OF IMAGES

(75) Inventor: Barton S. Wells, Palo Alto, CA (US)

(73) Assignee: AEPX Animation, Inc., Los Altos, CA (US)

( * ) Notice: Subject to any disclaimer, the term of this patent is extended or adjusted under 35 U.S.C. 154(b) by 24 days.

(21) Appl. No.: 11/271,532

(22) Filed: Nov. 9, 2005

(65) Prior Publication Data

US 2007/0104389 A1    May 10, 2007

(51) Int. Cl.
*G06K 9/00*    (2006.01)

(52) U.S. Cl. .................. 382/168; 345/421; 345/586; 345/607; 345/632; 345/633

(58) Field of Classification Search ........... 382/168; 345/421, 586, 607, 632, 633
See application file for complete search history.

(56) References Cited

U.S. PATENT DOCUMENTS

| | | | |
|---|---|---|---|
| 5,359,704 A | 10/1994 | Rossignac et al. | 395/122 |
| 5,561,746 A | 10/1996 | Murata et al. | 395/119 |
| 5,579,454 A | 11/1996 | Billyard et al. | 395/121 |
| 5,615,322 A | 3/1997 | Murata et al. | 395/133 |
| 5,644,689 A | 7/1997 | Ban et al. | 395/124 |
| 5,805,135 A | 9/1998 | Suzuoki et al. | 345/139 |
| 5,870,099 A | 2/1999 | Horii et al. | 345/427 |
| 5,877,769 A | 3/1999 | Shinohara | 345/425 |
| 5,977,979 A | 11/1999 | Clough et al. | 345/422 |
| 6,034,691 A | 3/2000 | Aono et al. | 345/425 |
| 6,091,422 A | 7/2000 | Ouaknine et al. | 345/419 |
| 6,201,546 B1 | 3/2001 | Bodor et al. | 345/430 |
| 6,226,005 B1 | 5/2001 | Laferriere | 345/426 |
| 6,392,644 B1 | 5/2002 | Miyata et al. | 345/419 |
| 6,400,364 B1 | 6/2002 | Akisada et al. | 345/427 |
| 6,417,850 B1 | 7/2002 | Kang | 345/422 |
| 6,784,882 B1 | 8/2004 | Sugiyama | 345/419 |
| 7,158,671 B2 * | 1/2007 | Yamazoe et al. | 382/167 |
| 2002/0008697 A1 | 1/2002 | Deering | 345/418 |
| 2002/0050988 A1 | 5/2002 | Petrov et al. | 345/418 |
| 2005/0001834 A1 | 1/2005 | Sugiyama | 345/419 |

OTHER PUBLICATIONS

Li et al. "Real-Time Video Object Segmentation Using HSV Space", Na Li, Jiajun Bu, and Chun Chen, Image Processing. 2002. Proceedings. 2002 International Conference on.*

Cucchiara et al. "Detecting Objects, Shadows and Ghosts in Video Streams by Exploiting Color and Motion Information", 2001 IEEE Computer Society Conference on Computer Vision and Pattern Recognition (CVPR'01)—vol. 2, p. 571.*

Cucchiara et al. "Detecting Moving Objects, Ghosts, and Shadows in Video Streams", IEEE Transactions on Pattern Analysis and Machine Intelligence, vol. 25, No. 10, Oct. 2003.*

(Continued)

*Primary Examiner*—Bhavesh M Mehta
*Assistant Examiner*—Christopher Lavin
(74) *Attorney, Agent, or Firm*—Zilka-Kotab, PC

(57) ABSTRACT

Systems, methods, and computer program products that identify and allow manipulation of shadows in a still frame (photo mode), or series of frames (movie mode). Manipulation of shadows includes such things as adjustment of shadow boundaries, softening of shadow boundaries, adjustment of shadow properties, and even removal of shadows altogether.

37 Claims, 11 Drawing Sheets

OTHER PUBLICATIONS

Nadimi et al. "Physical Modles for Moving Shadow and Object Detection in Video", S Nadimi, B Bhanu—Pattern Analysis and Machine Intelligence, IEEE Transactions, 2004.*

Prati et al. "Detecting Moving Shadows: Algorithms and Evaluation", Prati, A., Mikic, I., Trivedi, M.M., and Cucchiara, R., Pattern Analysis and Machine Intelligence, IEEE Transactions on, Jul. 2003, pp. 918-923.*

Fung et al. "Effective Moving Cast Shadow Detection for Monocular Color Image Sequences", Fung, G.S.K., Yung, N.H.C., Pang, G.K.H., and Lai, A.H.S., Image Analysis and Processing, 2001. Proceedings. 11th International Conference on, Sep. 26-28, 2001, pp. 404-409.*

Sato et al. "Illumination Distribution from Brightness in Shadows : Adaptive Estimation of Illumination Distribution with Unknown Reflectance Properties in Shadow Regions", Sato, I., Sato, Y., and Ikeuchi, K., Computer Vision, 1999. The Proceedings of the Seventh IEEE International Conference on, 1999, pp. 875-882.*

Sato et al. "Illumination from Shadows", Sato, I., Sato, Y., and Ikeuchi, K., Pattern Analysis and Machine Intelligence, IEEE Transactions on, Mar. 2003, pp. 290-300.*

Baisheng et al. "Indoor and Outdoor People Detection and Shadow Suppression by Exploiting HSV Color Information", Baisheng Chen and Yunqi Lei, Computer and Information Technology, 2004. CIT '04. The Fourth International Conference on, Sep. 14-16, 2004, pp. 137-142.*

PCT Search Report and Written Opinion from PCT Application No. PCT/US2006/40855 mailed on Jun. 4, 2007.

* cited by examiner

FIG. 5A      FIG. 5B

|  |  |  |  |  |
|---|---|---|---|---|
| -1 | -1 | -1 | -1 | -1 |
| -1 | -1 | -1 | -1 | -1 |
| -1 | -1 | 24 | -1 | -1 |
| -1 | -1 | -1 | -1 | -1 |
| -1 | -1 | -1 | -1 | -1 |

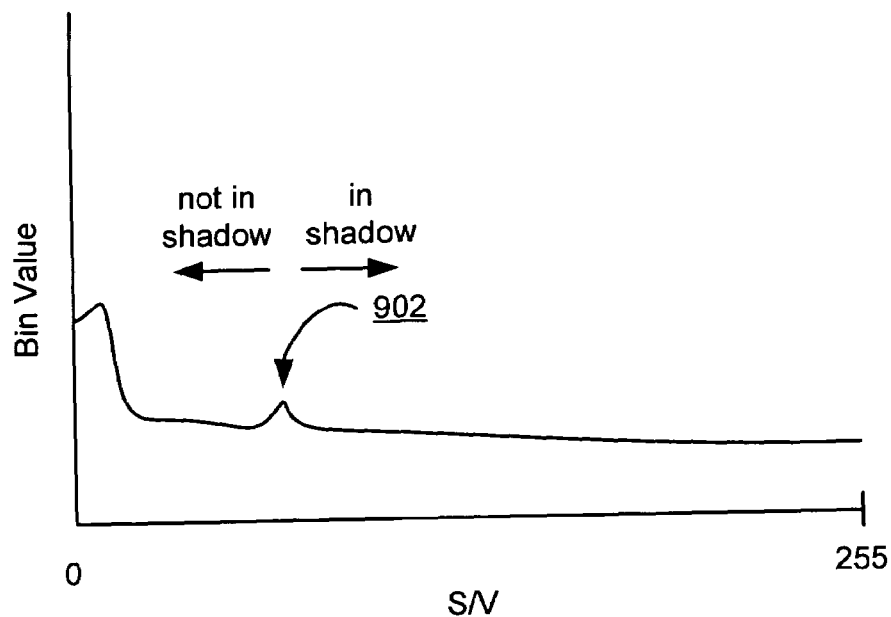
FIG. 9
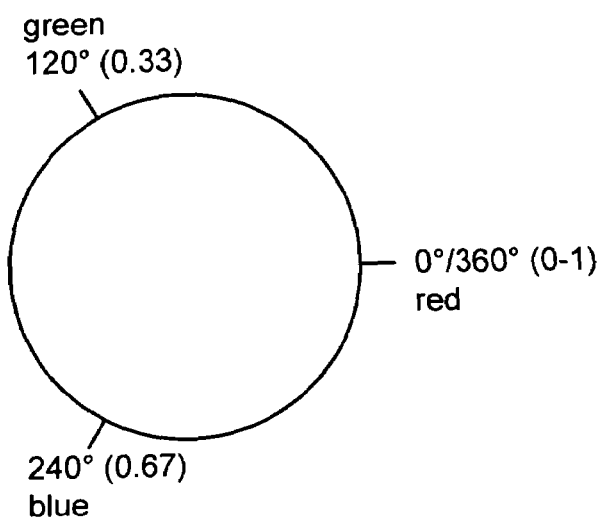
FIG. 10
FIG. 11

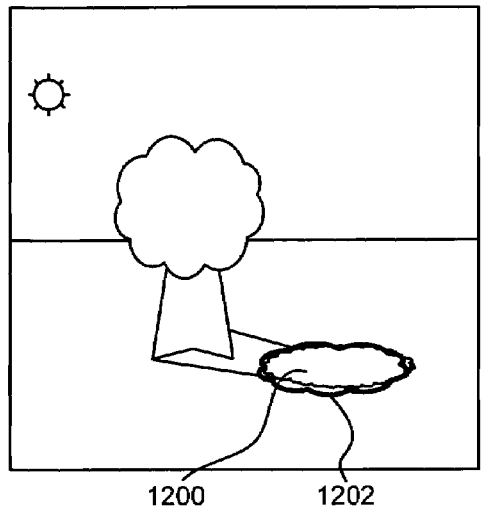
FIG. 12A
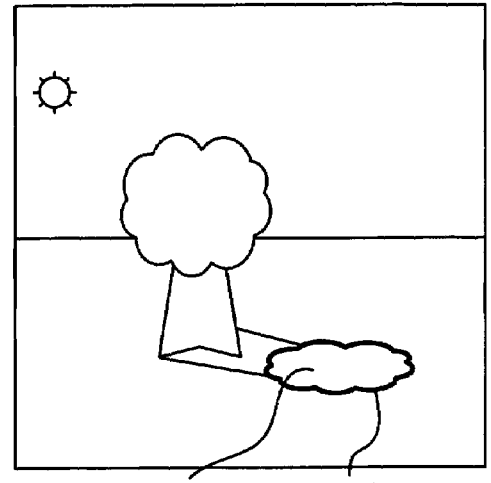
FIG. 12B
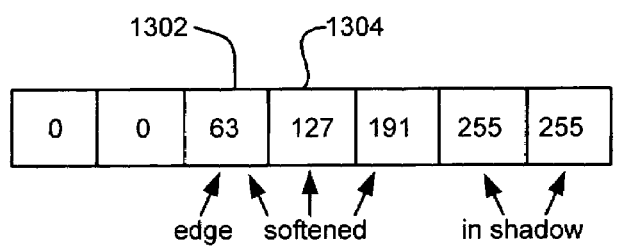
FIG. 13
| out | out | in |
|-----|-----|-----|
| out | in  | in |
| in  | in  | in |
6 pixels in of 9 pixels total
FIG. 14

DETECTION AND MANIPULATION OF SHADOWS IN AN IMAGE OR SERIES OF IMAGES

FIELD OF THE INVENTION

The present invention relates to image processing, and more particularly, this invention relates to identification and manipulation of shadows in a still image or series of images.

BACKGROUND OF THE INVENTION

Photography and moviemaking have become staples in modern society. A photograph is typically a single image frame of a real scene. Movies can be described as a series of frames that together form what appears to the human eye to be a continuously moving image. Both photographs and movies are now found in both physical and digital formats.

Image processing software is currently used by millions of people worldwide to perform a variety of image processing functions, perhaps the most typical of which is manually changing colors of pixels to make the image appear more realistic. Examples include removal of "red-eye" from human subjects, and touching up of edges.

However, image processing software has heretofore been unable to accurately identify shadows in an image. Nor has it been able to accurately tie shadowed portions of an object to nonshadowed portions of the same object. As such, the ability to work with shadows in image processing software is limited and inaccurate at best.

What is therefore needed is a way to automatically and accurately identify shadows in an image, and tie shadowed portions of objects to nonshadowed portions. This would open the door for improved photo processing capabilities, and allow automation of features that now require the manual user input. Such a solution would also reduce the inherent flaws in the effects heretofore manually created by human users.

It would also be desirable to accurately remove, lighten, or darken shadows from images. Prior methods of removing or lightening shadows merely lighten the entire image, giving the image a "washed out" look. Similarly, prior methods of darkening shadows darken the entire image. These methods fail to maintain the integrity of the nonshadowed portion of the image. Accordingly, the user is often required to revert to manual tools to adjust any shadowing.

SUMMARY OF THE INVENTION

Systems, methods, and computer program products that identify and allow manipulation of shadows in a still frame (photo mode), or series of frames (movie mode). Manipulation of shadows includes such things as adjustment of shadow boundaries, softening of shadow boundaries, adjustment of shadow properties, and even removal of shadows altogether.

A method for identifying pixels in shadow in an image according to one embodiment of the present invention includes analyzing an image for determining several properties thereof, the properties including hue (H), saturation (S), brightness (V), red color content (R), green color content (G), and blue color content (B). A first histogram of H/S values calculated for each pixel in the image is calculated. A second histogram of S/V values calculated for each pixel in the image is also calculated. A line feature in the first histogram is identified. Similarly, a line feature in the second histogram is identified. Pixels having an H/S value above the line feature in the first histogram and an S/V value above the line feature in the second histogram are marked as being in shadow.

A method for manipulating shadows of an image according to one embodiment of the present invention includes analyzing an image for determining several properties thereof. A determination is made as to which pixels of the image are in shadow. A shadow boundary adjustment and/or shadow boundary softening of the image is performed for a group of pixels determined to be in shadow, an outer periphery of the pixels determined to be in shadow defining the shadow boundary.

A method for identifying an object in an image according to an embodiment of the present invention includes analyzing an image for determining several properties thereof. Objects in the image are found based at least in part on the properties of the image. A first object determined to be at least primarily in shadow is selected. A second object adjacent the first object is also selected. The two objects are analyzed using the properties of the image for determining whether the two objects are part of a same overall object.

A method for removing shadows from an image according to one embodiment includes analyzing an image for determining several properties thereof. Objects in the image are found based at least in part on the properties of the image. A first object determined to be at least primarily in shadow is selected. A second object adjacent the first object is also selected, where the second object is not primarily in shadow. The two objects are analyzed using the properties of the image for determining whether the two objects are part of a same overall object. New red (R) values are calculated for pixels in the first object based on a ratio of an average R value of the pixels in the first object to an average R value of pixels in the second object. New green (G) values are calculated for pixels in the first object based on a ratio of an average G value of the pixels in the first object to an average G value of pixels in the second object. New blue (B) values are calculated for pixels in the first object based on a ratio of an average B value of the pixels in the first object to an average B value of pixels in the second object.

Additional embodiments and features of the present invention are presented below.

The invention can be implemented entirely in hardware, entirely in software, or a combination of the two. The invention can also be provided in the form of a computer program product comprising a computer readable medium having computer code thereon.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIGS. 5A-B depict Sobel masks, used during an edge detection process according to one embodiment of the present invention.

FIG. 9 illustrates an S/V histogram.

FIG. 10 illustrates a mask used during shadow detection according to one embodiment of the present invention.

FIG. 11 depicts a color wheel.

FIG. 12A illustrates an image generated by a shadow detection process.

FIG. 12B illustrates an image having enhanced shadow definition after a shadow detection process.

FIG. 13 depicts a pixel array after shadow edge softening.

FIG. 14 depicts a mask used during a shadow softening process.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

The following specification describes systems, methods, and computer program products that identify and allow manipulation of shadows in a still frame (photo mode), or series of frames (movie mode). Manipulation of shadows includes such things as adjustment of shadow boundaries, softening of shadow boundaries, adjustment of shadow properties, and even removal of shadows altogether.

The invention can be implemented entirely in hardware, entirely in software, or a combination of the two. The invention can also be provided in the form of a computer program product comprising a computer readable medium having computer code thereon. A computer readable medium can include any medium capable of storing computer code thereon for use by a computer, including optical media such as read only and writeable CD and DVD, magnetic memory, semiconductor memory (e.g., FLASH memory and other portable memory cards, etc.), etc.

A computer for storing and/or executing the code and/or performing the processes described herein can be any type of computing device, including a personal computer (PC), laptop computer, handheld device (e.g., personal digital assistant (PDA)), portable telephone, etc.

Figure 1:
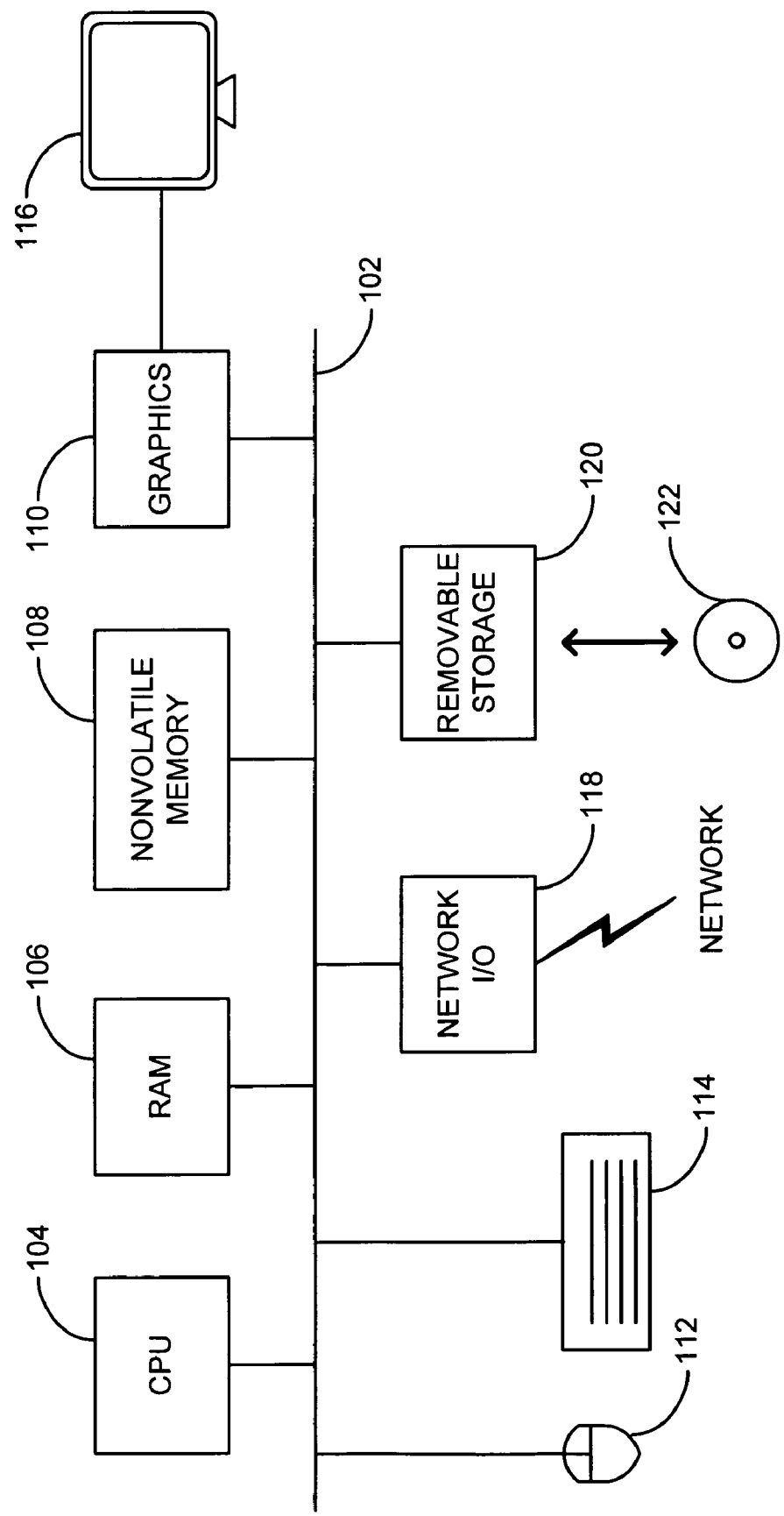
FIG. 1 illustrates a hardware system useable in the context of the present invention.

FIG. 1 illustrates a computer 100 according to one embodiment. As shown, the computer 100 includes a system bus 102 to which a processor 104 is coupled. The processor 104 executes instructions found in the code, and controls several of the other components of the computer 100. Memory including Random Access Memory (RAM) 106 and nonvolatile memory 108 (e.g., hard disk drive) store the code or portions thereof, as well as data, during performance of the processes set forth herein. A graphics rendering subsystem 110 may also be present, and can include a separate graphics processor and additional memory.

Various In/Out (I/O) devices are also present. User input devices such as a keyboard 112 and mouse 114 allow a user to provide user instructions to the computer 100. A monitor 116 or other display device outputs graphical information to the user. If a graphics subsystem 110 is present (as shown), the display device can be coupled to the graphics subsystem 110 instead of directly to the bus 102. A network interface 118 may also be provided to allow the computer 100 to connect to remote computing devices for a variety of purposes including data upload, data download, etc. A media reader 120 such as a DVD player or FLASH memory port may be present for reading code from a computer readable medium 122.

The following description is applicable to creation of both still frame images as well as a series of frames, as in a movie. For simplicity, much of the following description shall refer to the functions performed on a single frame, it being understood that the procedures set forth herein can be sequentially applied to multiple frames, e.g., of a movie.

To aid the reader in understanding the overall aspects of the invention, high level processes will first be described, followed by a detailed description of each operation. Note that while the order of the steps performed is generally preferred, the order is not critical and the software can perform some operations prior to others, some in parallel, etc. Further, not all operations presented are required by the invention, but rather are optional.

Figure 2:
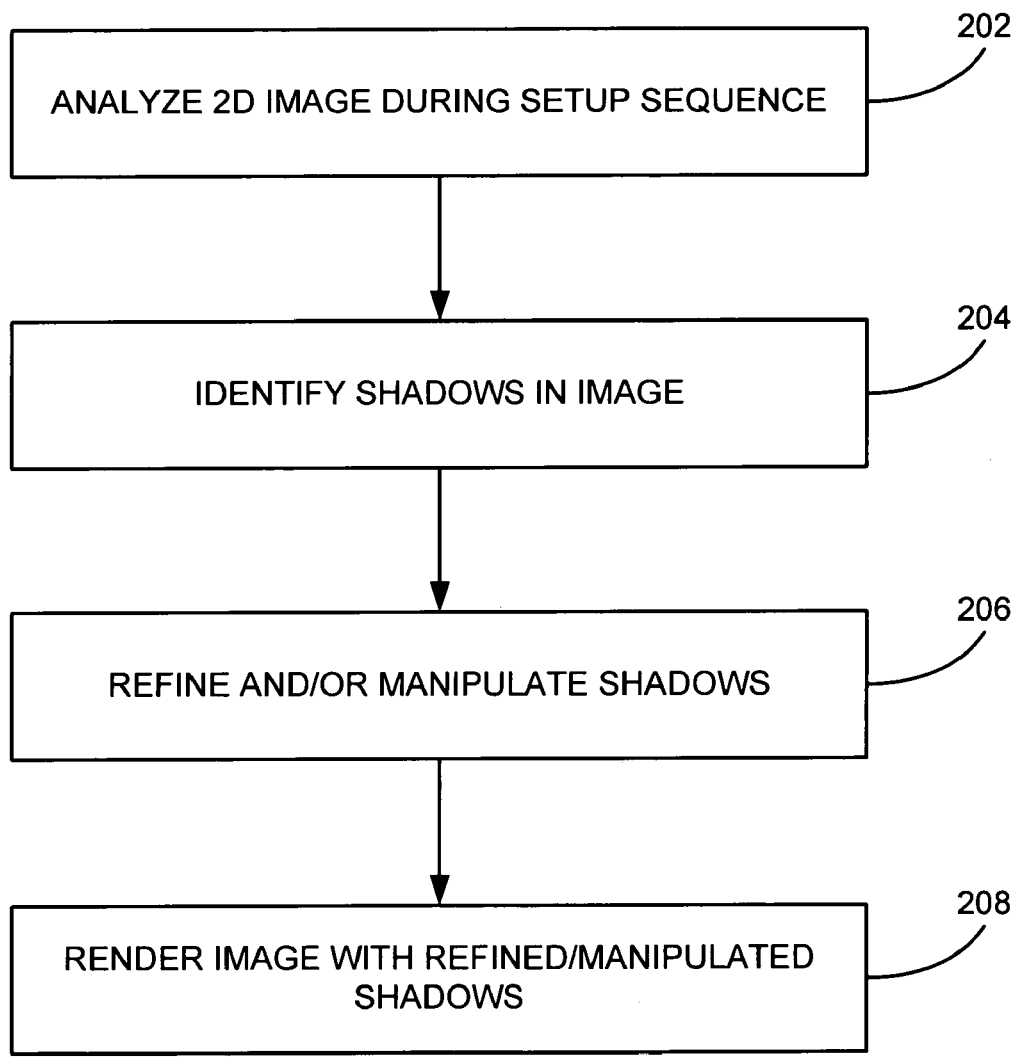
FIG. 2 is a flow diagram of a high level process of an embodiment of the present invention.

FIG. 2 depicts the high level process 200 performed during image processing according to one embodiment. In operation 202, an image is analyzed during a set up sequence. In operation 204, shadows in the image are identified. In operation 206, the image is processed for refining and/or manipulating the shadows. In operation 208, the image is then rendered with the manipulated shadows.

Figure 3:
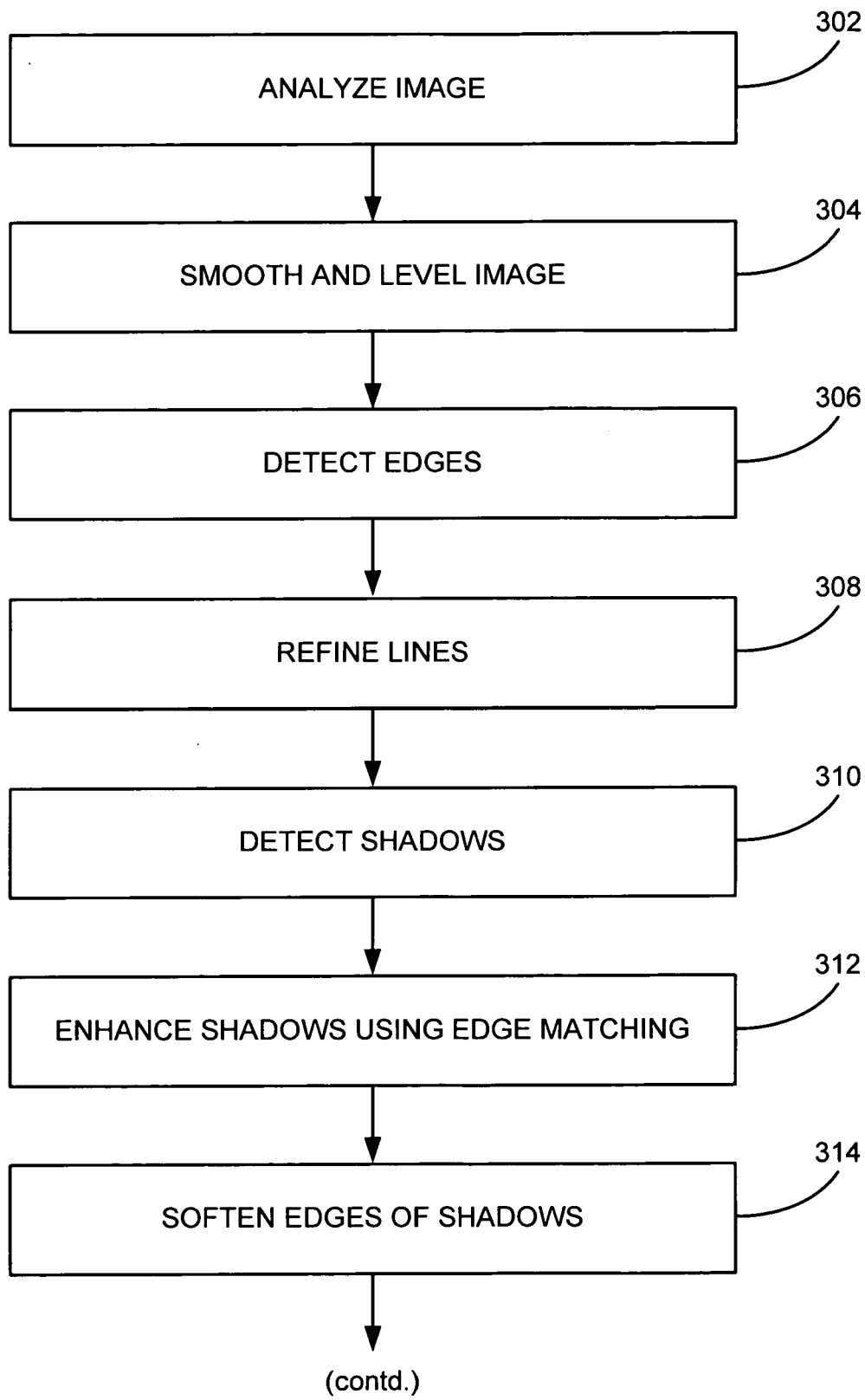
FIG. 3 is flow diagram of a process according to one embodiment of the present invention.
Figure 3:
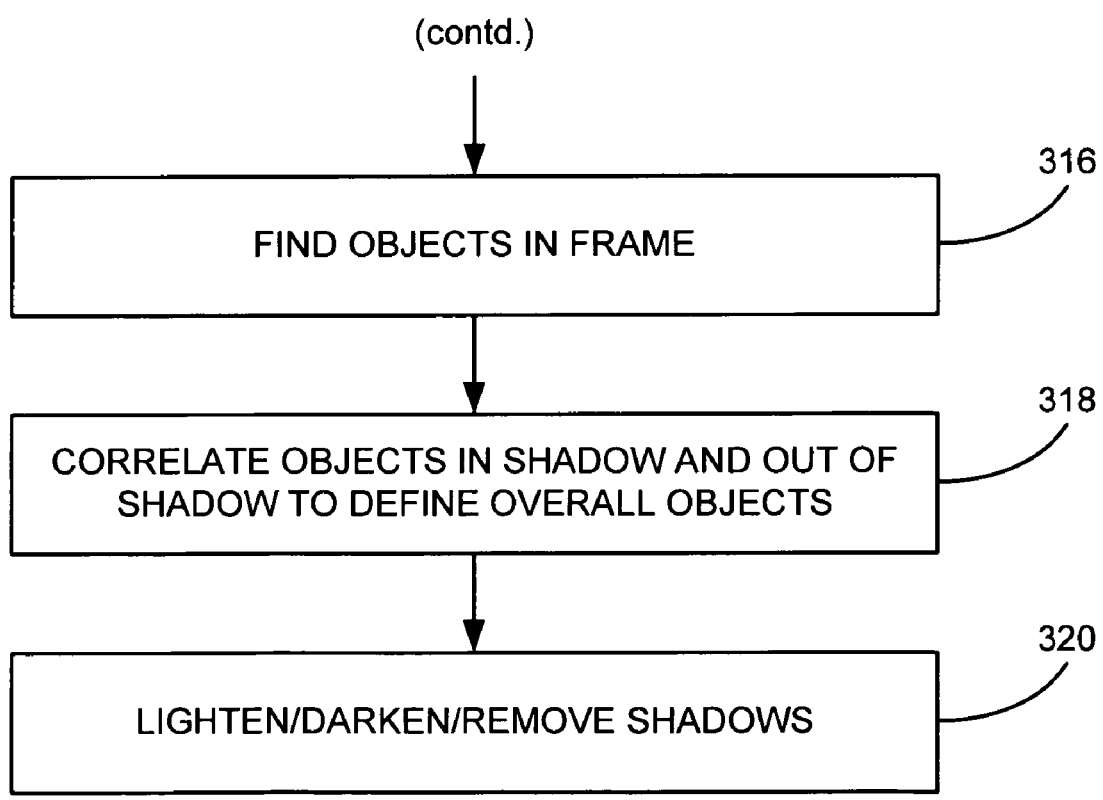

FIG. 3 illustrates the general process 300 performed by a preferred embodiment of the present invention. In operation 302, the image is analyzed for determining several of its properties. These properties include hue (H), saturation (S), brightness value (V), and red, green and blue (R, G, B) color intensity. H, S, V, R, G, and B values for each pixel are stored in a frame buffer or buffers. In operation 304, the image is smoothed and leveled. In operation 306, edges in the image are detected. In operation 308, lines are refined based on the detected edges. In operation 310, the shadows in the image are detected, e.g., based on analysis of HSV of interesting pixel and surrounding pixels. In operation 312, shadows in the image are matched with the edges found in operation 306 to refine and further define the shadow boundaries. In operation 314, shadow edges are softened. In operation 316, objects on the image are found, e.g., using a flood fill algorithm to find areas inside and outside shadows having similar HSVRGB values. In operation 318, objects in shadow and out of shadow are correlated to define overall objects. In operation 320, the shadows can be lightened, darkened, and/or removed.

Other embodiments of the present invention may perform only a subset of these steps and/or additional steps. Further, the order in which the steps for this and other disclosed processes are presented by way of example only, and is in no way meant to require that the present invention perform the steps in the same order presented. Rather, the various steps (or portion thereof) can be performed in any order.

Set Up

As noted above, the first stage is preparing the image for rendering. An image is loaded into the host system. The image can be, for example, a high quality natural image captured with a digital camera. The image can also be a scanned from a picture, generated from film negatives, etc. The image can further be a purely computer-generated 2D image.

Several properties of the image are gathered. Red (R), Green (G) and Blue (B) properties are known for a digital image. The image is also analyzed to determine the Hue (H), Saturation (S) and Brightness Value (V) of each pixel in the image. Hue (H) refers to the relative color of the pixel on the red-green-blue color wheel. Saturation (S) is the degree of color depth. For example, a pure red is completely saturated while pure white is completely non-saturated. The Brightness Value (V) indicates the brightness level of the pixel.

The Saturation (S) may be determined as follows. For each pixel, determine which color (RGB) has the highest and lowest brightness (V and Vmin, respectively). RGB brightness values in one example vary from 0 to 255 (256 shades per R, G or B). The value V is set to the largest brightness value from among the three colors, i.e., the highest brightness of the three colors. For instance, a pixel in the sky portion of a landscape image would likely have blue as the brightest color. If so, V is set to the blue brightness value. Likewise, Vmin is set to the lowest brightness value.

S can be determined by the following equation:

$$S = \frac{V - V\min}{V}$$

If the pixel is black, S can be set to zero.

The Hue (H) is also determined. If S=0, H can be set as undefined. If S≠0, the distance for each color can be determined by the following equation (here demonstrated as the red distance (Rdist)).

$$Rdist = \frac{V - Vred}{V - V\min}$$

where Vred is the brightness value of the red color for that pixel. Likewise the green distance (Gdist) and blue distance (Bdist) are also calculated. H is then calculated using one of the following equations.

If V=Vred, then:

$H=Bdist-Gdist.$

If V=Vgreen, then:

$H=2+Rdist-Bdist$

If V=Vblue, then $H=4+Gdist-Rdist$

The resulting values of the foregoing analyses are in (H,S,V) form, where H varies from 0.0 to 6.0, indicating the position along the color circle where the hue is located. S and V vary from 0.0 to 1.0, with 0.0 being the least amount and 1.0 being the greatest amount of saturation or value, respectively. Note that larger or smaller scales can be used, e.g., 0-1, 0-100, 0-360, etc. For example, if the color scale is 360 (as in a color circle), H can be calculated in angular coordinates using the following formula, which is equivalent to the immediately prior formula:

$H=240+(Gdist-Rdist)\times60$

The resulting values of this equation vary from 0.0 to 360.0, indicating the position along the color circle where the hue is located. As an angular coordinate, H can wrap around from 360 back to 0, so any value of H outside of the 0.0 to 360.0 range can be mapped onto that range by dividing H by 360.0 and finding the remainder (also known as modular arithmetic). Thus, −30 is equivalent to 330, and 480 is equivalent to 120, for example.

H, S, and V images of the image are created and stored in a frame buffer or buffers. The frame buffer may be a type of RAM, nonvolatile memory such as a magnetic disk, etc. If there are several images, such as in a movie mode, each image of the series of images is analyzed, and HSV images are created and stored for each image. R, G, and B values for each pixel in the image are also stored in a frame buffer or buffers.

Now that the properties of the image are determined and stored, further processing using these properties is performed.

Leveling data may be created and stored for use in subsequent processing such as object identification. An R, G, B histogram is obtained of the whole image. Suppose there are 1,000,000 pixels in the image, and 256 shades per color. The number of pixels in each shade are stored in bins representing each component from 0 to 255. For example, if 8,201 pixels have an R shade of 35, the bin for shade 35 will have a value of 8,201.

Each bin would have about 1,000,000/256=3906 pixels if the colors were evenly distributed. Using this value, the old image is mapped to the new image to obtain about an equal distribution of color across the entire image, thereby varying the contrast as much as possible. During the mapping sequence, bin 0 is summed with the next bin or bins until the sum >3906. Supposing bins 0-2 total 4000, then all pixels associated with bins 0-2 are give a first shade. Then bin 3 is added to the next bin or bins until the sum >3906. Then all pixels associated with bins 3-n are give a second shade. Thus, the color contrast is maximized. This in turn is useful for such things as object recognition using flood fill algorithms, as discussed below.

Next, the objects in the image are identified. To identify objects in the image, edge detection is performed to detect edges in the image, as edges tend to denote boundaries between or on objects. However, images usually have some sort of "noise" or edge distortion due to the inherent irregularities in real-life objects, as well as the limitations in the camera or scanner and as an effect of any compression. An example of image noise in a real-life object is found in concrete with a rock facade, where each rock has an edge and so appears to be its own object.

Thus, a smoothing process is preferably performed prior to detecting the edges. The purpose of noise smoothing is to reduce various spurious effects of a local nature in the image, caused perhaps by noise in the image acquisition system, or arising as a result of compression of the image, for example as is typically done automatically by consumer-grade digital cameras. The smoothing can be done either by considering the real space image, or its Fourier transform.

The simplest smoothing approach is neighborhood averaging, where each pixel is replaced by the average value of the pixels contained in some neighborhood about it.

Figure 4:
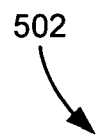
FIG. 4 illustrates a mask for neighborhood averaging, used during a smoothing process according to one embodiment of the present invention.

The simplest case is probably to consider the 3×3 group of pixels centered on the given pixel, and to replace the central pixel value by the unweighted average of these nine pixels. For example, the central pixel in the mask 400 of FIG. 4 is replaced by the value 13 (the nearest integer to the average).

If any one of the pixels in the neighborhood has a faulty value due to noise, this fault will now be spread over nine pixels as the image is smoothed. This in turn tends to blur the image.

A more preferable approach is to use a median filter. A neighborhood around the pixel under consideration is used, but this time the pixel value is replaced by the median pixel value in the neighborhood. Thus, for a 3×3 neighborhood, the 9 pixel values are written in sorted order, and the central pixel is replaced by the fifth highest value. For example, again taking the data shown in FIG. 4, the central pixel is replaced by the value 12.

This approach has two advantages. First, occasional spurious high or low values are not averaged in, they are ignored. Second, the sharpness of edges is preserved.

Another smoothing method is Gaussian smoothing. Gaussian smoothing is performed by convolving an image with a Gaussian operator which is defined below. By using Gaussian smoothing in conjunction with the Laplacian operator, or another Gaussian operator, it is possible to detect edges.

The Gaussian outputs a "weighted average" of each pixel's neighborhood, with the average weighted more towards the value of the central pixels. The Gaussian distribution function in two variables, g(x,y), is defined by:

$$g(x, y) = \frac{1}{2\pi\sigma^2} e^{-(x^2+y^2)/2\sigma^2}$$

Where σ is the standard deviation representing the width of the Gaussian distribution. The shape of the distribution and hence the amount of smoothing can be controlled by varying σ. In order to smooth an image f(x,y), it is convolved with g(x,y) to produce a smoothed image s(x,y), i.e., s(x,y)=f(x,y)*g(x,y).

A further way to compute a Gaussian smoothing with a large standard deviation is to convolve an image several times with a smaller Gaussian. While this is computationally complex, it is practical if the processing is carried out using a hardware pipeline.

Having smoothed the image, e.g., with a Gaussian operator, the edges in the smoothed image can be detected. There are many ways to perform edge detection. However, the majority of different methods may be grouped into two categories, gradient and Laplacian. The gradient method detects the edges by looking for the maximum and minimum in the first derivative of the image. The Laplacian method searches for zero crossings in the second derivative of the image to find edges.

One suitable gradient edge detection algorithm uses the Sobel method. The Sobel operator performs a 2-D spatial gradient measurement on an image. Typically it is used to find the approximate absolute gradient magnitude at each point in an input grayscale image. The Sobel edge detector uses a pair of 3×3 convolution masks, one estimating the gradient in the x-direction (colunms) and the other estimating the gradient in the y-direction (rows). A convolution mask is usually much smaller than the actual image. As a result, the mask is slid over the image, manipulating a square of pixels at a time. Illustrative Sobel masks 500, 502 are shown in FIGS. 5A and 5B, respectively.

The magnitude of the gradient is then calculated using the formula:

$$|G|=\sqrt{Gx^2+Gy^2}$$

An approximate magnitude can be calculated using:

$$|G|=|Gx|+|Gy|$$

A pixel location is declared an edge location if the value of the gradient exceeds some threshold. As mentioned above, edges will have higher pixel intensity values than those surrounding it. So once a threshold is set, the gradient value can be compared to the threshold value and an edge detected whenever the threshold is exceeded.

Figure 6:
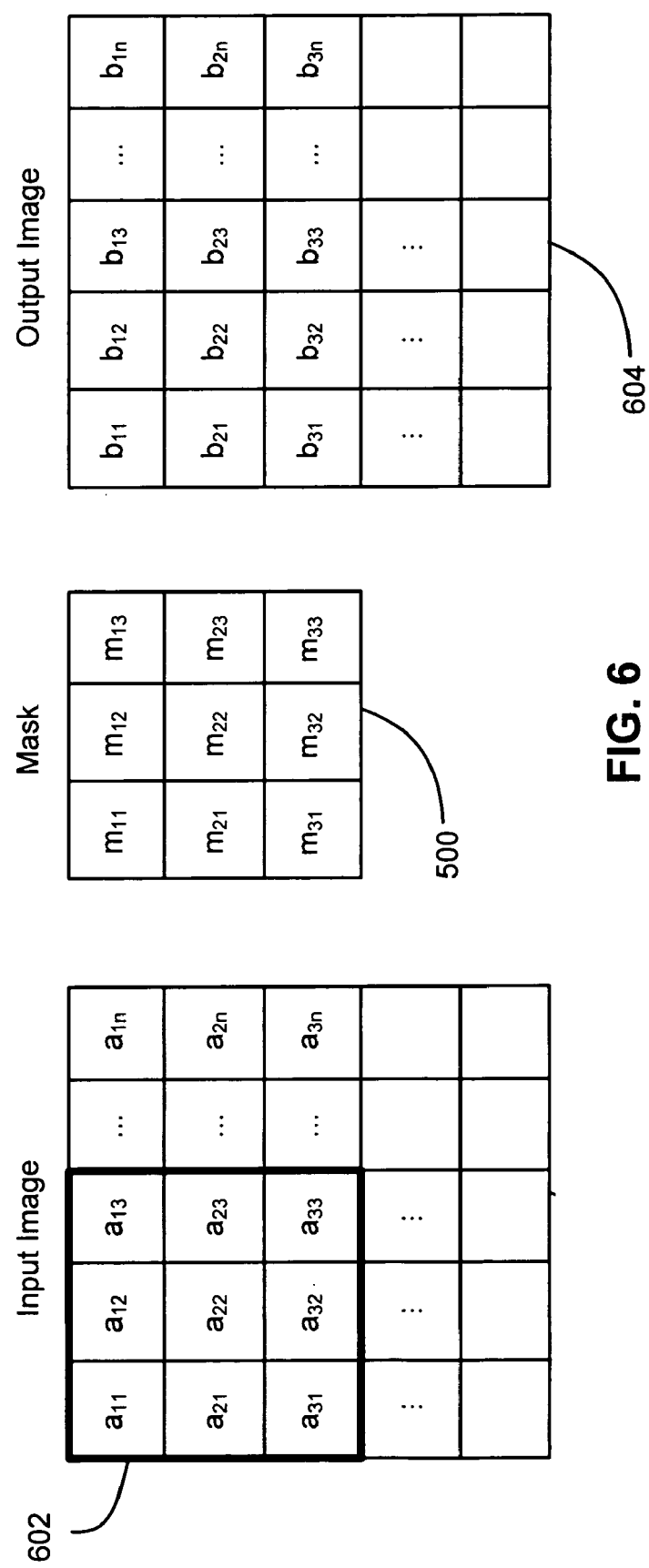
FIG. 6 illustrates processing using a Sobel mask.

When using the Sobel method, the mask is positioned over an area of the input image, that pixel's value is changed, and then the mask is shifted one pixel to the right. This sequence continues to the right until it reaches the end of a row. The procedure then continues at the beginning of the next row. The example in FIG. 6 shows the mask 500 being slid over the top left portion of the input image 600 represented by the heavy outline 602. The formula below shows how a particular pixel in the output image 604 can be calculated. The center of the mask is placed over the pixel being manipulated in the image. It is important to notice that pixels in the first and last rows, as well as the first and last columns cannot be manipulated by a 3×3 mask. This is because when placing the center of the mask over a pixel in the first row (for example), the mask will be outside the image boundaries.

$$B_{22}=(a_{11}*m_{11})+(a_{12}*m_{12})+(a_{13}*m_{13})+(a_{21}*m_{21})+ \\ (a_{22}*m_{22})+(a_{23}*m_{23})+a_{31}*m_{31})+(a_{32}*m_{32})+ \\ (a_{33}*m_{33})$$

The Gx mask highlights the edges in the horizontal direction while the Gy mask highlights the edges in the vertical direction. After taking the magnitude of both, the resulting output detects edges in both directions.

The approximate direction of an edge can further be calculated by assuming the angle of the edge is the inverse tangent of Δy/Δx:

$$\tan^{-1}\left(\frac{\Delta y}{\Delta x}\right)$$

So, for each mask (Gx or Gy), the change in value in the x direction or the change in value in the y direction are calculated to obtain an approximate angle for that edge.

As mentioned before, edges will have higher pixel intensity values than those surrounding it. So once a threshold is set, you can compare the gradient value to the threshold value and detect an edge whenever the threshold is exceeded. Furthermore, when the first derivative is at a maximum, the second derivative is zero. As a result, another alternative to finding the location of an edge is to locate the zeros in the second derivative. This method is known as the Laplacian.

In one embedment of the present invention, the 5×5 Laplacian used is a convoluted mask to approximate the second derivative, unlike the Sobel method which approximates the gradient. And instead of two 3×3 Sobel masks, one for each of the x and y directions, Laplace uses one 5×5 mask for the second derivative in both the x and y directions.

Figures 7, 8:
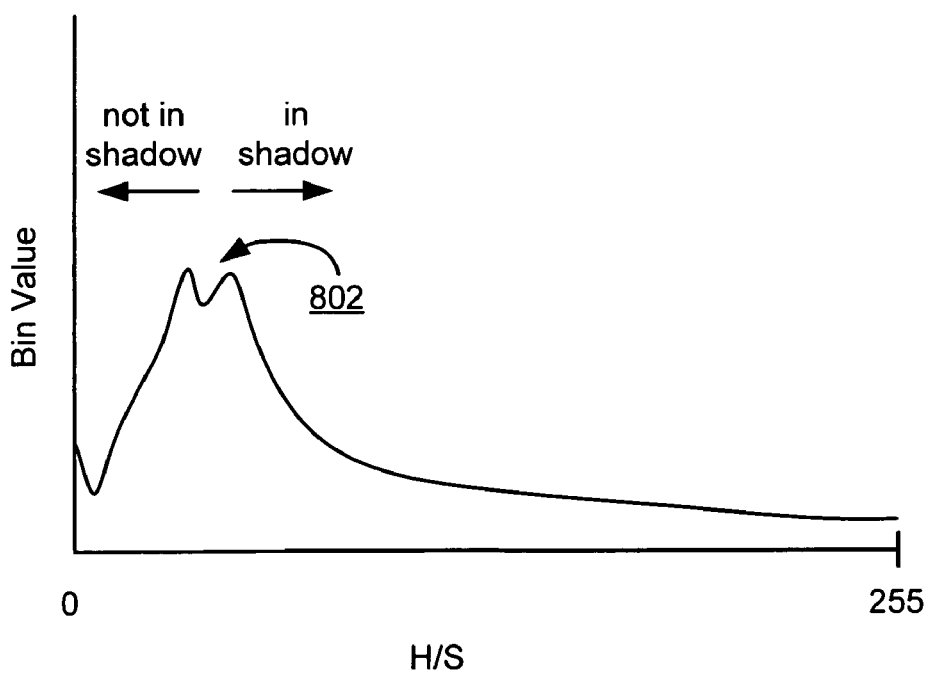
FIG. 7 depicts a Laplace mask, used during an edge detection process according to one embodiment of the present invention.
FIG. 8 illustrates an H/S histogram.

However, because these masks are approximating a second derivative measurement on the image, they are very sensitive to noise and are therefore less preferable to the Sobel method and thus presented here as an alternate method. The Laplace mask 700 is shown in FIG. 7.

At this point in the processing, the edges and directions (angles) of the edges have been calculated for all of the objects in the image. In an image, after smoothing and edge detection, several fringe lines are typically found along the real edge line. In order to make the lines appear clean and continuous, it is desirable to remove the fringe lines and fill in any discontinuities.

Accordingly, the process continues by thinning the lines found during edge detection, and intelligently filling the lines. A hysteresis algorithm known in the art is run to thin each line along the angle calculated for the line. The algorithm removes fringe lines and thins the line. However, this may result in a thin, broken line. The breaks may indicate an end of the line and start of another, or may just be gaps created by the hysteresis algorithm or missing from the original image.

Accordingly, the next step is to identify the ends of the lines. The following equation can be used to find the ends of the line:

Line density=((number of potential pixels+5$F$−2$E$)/ number of potential pixels)

where F=number of full pixels, and E=number of empty pixels. The multipliers 5 and 2 are provided by way of example, and can be varied depending on the desired sensitivity. Every pixel along a line is considered a potential pixel, and so each step along the line increases the potential pixel count by one. Every time a pixel is filled in, the count of F is increase by one. When a potential pixel is not filled in, the count of E is increased by one. When the line density drops below zero, the process stops and the system assumes it has found the end of the line.

Now that the ends of the lines are known, a line thickening algorithm is used to run along the line and builds up the line density between the ends previously identified. Every time there is a potential pixel in a gap, the gap is filled in. The result is a solid line.

The foregoing sets up the image for subsequent processing. As mentioned above, the data heretofore generated can be stored in one or more frame buffers. Likewise, results of the subsequent processing steps can also be stored in one or more frame buffers.

The sequence continues by identifying shadows in the image. A preferred method for identifying shadows analyzes how the H, S and V values change across the image using the HSV data previously stored during set up. Thus, the procedure is not just looking for an area that is darker, but rather compares the properties in a given pixel to the properties in surrounding pixels.

Two histograms are created. One histogram is generated by analyzing H/S values for each pixel. A representative H/S histogram 800 is shown in FIG. 8. Supposing there are 256 possible values of H/S, the resulting H/S values are tabulated, e.g., in bins from 0-255, the value in each bin increasing each time an H/S value matching that bin is detected. The tabulated values are then plotted in a histogram. The second histogram is generated by analyzing S/V values for each pixel. A representative S/V histogram 900 is shown in FIG. 9. Again, the number of occurrences of a particular value can be tabulated in bins.

The H/S and S/V histograms are then used to identify shadows based on the tendency that a border between shadow and not shadow lies near H=S and S=V. That is, S/V=1 and H/S=1. Thus, the histograms tend to have a feature in the plot line such as a peak or valley corresponding to the shadow edges. How these tendencies are taken advantage of is presented next. The scaling from 0 to 255 is random . . . I chose it just b/c I have been doing that for other histograms. In the example I was showing you, I was maxing out the histogram at 10.0 (which I was scaling to 255), and therefore a value of 1.0 would equal around 25 or 26 on the histogram graph, and therefore I'd be looking for the valley or peak around there. Both peak and valley actually lie just above 1.0 (25 or 26). I take 1.0 as the minimum.

With continued reference to FIG. 8, shadow detection continues by comparing H/S for each pixel with the H/S histogram 800. The inventor has found that the histogram will typically have a line feature 802 such as a valley defined by two peaks. Any pixels having an H/S value to the left of the valley are flagged as potentially not in a shadow. Any pixels having an H/S value to the right of the valley are flagged as potentially being in a shadow. Pixels on the line feature, e.g., in the valley, may be marked as potentially being in shadow or potentially not being in shadow, depending on a default setting or user preference. The line feature is typically around 1.0 on a 0.0-10.0 point scale (or about 25-26 on a 0-255 scale). In several image processing experiments, the line feature was found to typically lie just above 1.0 on a 10.0 point scale.

With reference to FIG. 9, the S/V for each pixel is also compared with the S/V histogram 900. The inventor has found that the S/V histogram will typically have a line feature 902 such as a peak somewhere around 1 on a 10-point scale (scaled from 0-255). Any pixels having an S/V value to the left of the peak are flagged as potentially not in a shadow. Any pixels having an S/V value to the right of the peak are flagged as potentially being in a shadow. Pixels on the line feature, e.g., on the peak, may be marked as potentially being in shadow or potentially not being in shadow, depending on a default setting or user preference. The line feature is typically around 1 on a 0.0 to 10 point scale (or about 25-26 on a 0-255 scale). In several image processing experiments, the line feature was found to typically lie just above 1.0 on a 10.0 point scale.

If a particular pixel is flagged as potentially being in shadow by both histogram analyses, then the pixel is marked as being in a shadow. If a pixel is flagged as potentially being in a shadow and potentially not being in a shadow, the pixel can be considered to be in a shadow or not depending on the default or user-defined setting.

For either histogram analysis, the threshold value for determining whether to flag the pixel as in shadow or not can be set at a default value, e.g., 1.0. Further, a user may be allowed to modify the flagging thresholds of the histograms in order to further define what is considered to be in shadow or not.

Also note that flagging a pixel as potentially in shadow or not is not to be limited to actual marking of the data, but also includes flagging by not marking data, e.g., marking pixels in shadow and not marking pixels not in shadow, thereby essentially flagging the pixels as being in shadow or not based on whether the pixel is marked or not.

Thus, for values P and Q as determined from the histograms, if H/S>P and if S/V>Q for a particular pixel, then the pixel is considered to be in a shadow. These equations are based on the following observations. In a shadow, S goes up, while V goes down. If something is black, S may stay the same. The inventor has also found that shadows in images have a high blue saturation. In a shadow, which inherently is not receiving direct light from a primary light source, blue light tends to scatter more into the shadow relative to red and green light. Thus, H is important because the bluer the pixel H is over S, the more likely it is to be in a shadow. Accordingly, the position and area of a shadow in an image can be estimated. This gives a very good approximation of where the shadows are located.

The foregoing histogram analyses may also be performed with smoothing. A mask is run over the image to detect how H, S and V change in all directions (x and y). An illustrative 3×3 mask 1000 is shown in FIG. 10. H runs from 0 to 360 degrees on a color wheel. FIG. 11 depicts a color wheel 1100. Assume the angular coordinates are converted to values between 0 and 1, where 0=0° and 1=360°. Thus, 180° corresponds to 0.5, etc. 0 is red, 0.333 (120°) is green, and 0.666 (180°) is blue.

Using the mask, add up H, S and V values for all pixels in the mask (around and including the center pixel) to create the histograms. Then compare the H/S and S/V data to the histograms as above. For histogram feature values P and Q, if H/S>P, and if S/V>Q, then the center pixel is considered to be in a shadow.

In any given image, a shadow will typically not be a constituent shade, due in part to the texture of the shadowed image, and in part to the inherent variations in image quality due to such things as equipment (camera) flaws, film variations, and compression effects. These effects may cause errors in the estimation of the shadows on the image. FIG. 12A illustrates how a shadow 1200 may have a jagged edge, for example. Taking advantage of the fact that the edges 1202 in the image have already been detected, the image is processed both horizontally and vertically to match the shadow 1200 to the nearest edge 1202. If the shadow 1200 is within a certain proximity to the edge 1202 (number of pixels away), the shadow area is moved to the edge. Now the shadows appear close to what they should be, as shown in FIG. 12B.

A shadow boundary adjustment process according to one embodiment includes scanning the image line by line both horizontally and vertically. When an edge is detected (as previously found during edge detection), a number of pixels between the edge and pixels in shadow is determined. If that number is within a predetermined number of pixels, e.g., 2-10 pixels, the shadow boundary is extended back to the edge. This may entail marking additional pixels as being in shadow.

Similarly, if the pixels being analyzed are in shadow, when the scan exits the shadow, a determination is made as to whether another edge is encountered in a predetermined number of pixels, e.g., 2-10 pixels. If so, the shadow boundary is extended out to the edge.

The number of pixels to search beyond the edge or shadow boundary can be based on one or many things. Several examples follow. The number of pixels can be based on the histograms. This is because the shadow pixels along the edges may have fallen on the wrong side of the line features in the histograms. The number of pixels to search beyond the edge or shadow end can also be an arbitrary number defined by the user, can be preset, can be based on a percentage of total pixels in the image, etc. The number of pixels to search can also be based on a percentage, e.g., 1%, of the width or height.

The edges of the shadow are preferably softened as part of the extending of the shadow to the edges as described above. One way to do this is to mark how much a pixel is in shadow along some scale, e.g., 0-255, where 0 is out of shadow, and 255 is completely in shadow. Assume an edge now abuts a shadow to the right of the edge, as shown in the pixel array 1300 of FIG. 13. Before processing, pixels to the left of the edge have a value of 0, while pixels to the right of the edge pixel have a value of 255. To soften the edges of the shadow, the pixel 1302 to the left of the edge pixel 1304 is given a value of 0, and the properties of the pixels to the right of the edge pixel 1304 are adjusted to a percentage of full shadow properties. The rate of shadow softening can be based on a linear interpolation, as shown.

It is also desirable to soften the shadow edges where the shadow pixels already meet the pre-identified edges, in order to avoid a sharp change in contrast from shadow to non-shadow pixels. To achieve this, every pixel that is supposed to be in a shadow, and its neighbors, are analyzed to determine how many of its neighbors are also in the shadow. This can be performed using, e.g., a 3×3 mask or 5×5 mask. As shown in FIG. 14, if six of the nine pixels in the mask 1400 are marked as being "in" a shadow, thus indicating that it is near an edge of the shadow, the center pixel is given a shadow adjustment value, e.g., of 6/9, which lightens the center pixel by 66.66%. If all pixels in the mask are in a shadow, the center pixel is given a shadow adjustment of 9/9, i.e., no lightening. Note that this may eliminate the aforementioned softening element in a combined shadow extension/softening process.

At this point, all of the shadows have been identified.

The process next identifies the objects in the image. Note that object identification can be performed earlier, but finding the shadows first results in some efficiency benefits, as will soon become apparent.

As an optional set up step, the H, S, and V images can be smoothed. The inventor has found through experimentation that the following processes work better after smoothing.

One method for identifying objects is to execute a flood fill algorithm of a type known in the art that groups all areas within a certain color range of each other. Each grouped area can then be considered an object.

A more accurate way to use a flood filling algorithm is to use the average differences in H, S, V, R, G and B to determine how much areas of the image vary in color and H, S and V. In this method, a mask (e.g., 3×3 mask) is run over all of the pixels to determine the average changes between adjacent pixels for all six categories (H, S, V, R, G, B). A flood fill algorithm is executed to find areas of similar pixels outside the shadows. This allows the program to compensate for such things as faded or bright areas on an object, etc.

An illustrative flood fill algorithm looks at a pixel and compares its H, S, V, R, G, and/or B values to those of its neighboring pixels. If the values are within a prespecified range, the pixel is marked as being in a group. The sequence is repeated for the next pixel. An illustrative flood fill algorithm is:

If $\Delta\xi/(\text{avg } \Delta\xi \times K) < 1.0$, then in range where $\xi$ is the H, S, V, R, G or B value and K is a constant. $\Delta\xi$ refers to the change in H, S, V, R, G or B value between the pixel of interest and one of the pixels adjacent to it. Avg $\Delta\xi$ refers to the average change in H, S, V, R, G or B value between the pixel of interest and remaining pixels in the image. A computation for some or all of H, S, V, R, G and B can be performed for each pixel. S and R, G, B are preferably given more weight than H and V, because a change in S and R, G, B likely indicates a transition from one object to another.

A further way to use a flood filling algorithm is to perform the foregoing, but use the leveling data described previously.

A preferred method for identifying objects in the image is to use a histogram. In general, the image is analyzed to determine the change in R, G, B, H, S, and/or V between adjacent pixels, and a histogram is created of the changes. Peaks appear in the histogram. These peaks are then used identify edges between objects in the image.

Figures 15, 16, 17:
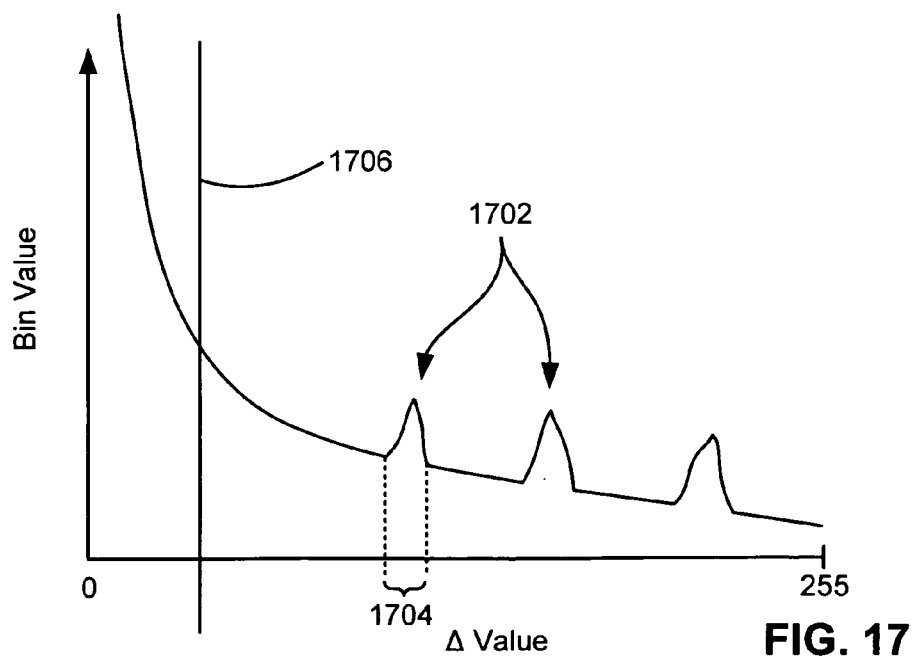
FIG. 15 illustrates a portion of an image during a histogram-based object recognition process.
FIG. 16 depicts a representation of bins used during a histogram-based object recognition process.
FIG. 17 illustrates a representative histogram used during a histogram-based object recognition process.

FIG. 15 illustrates a portion of an image 1500 having pixels A1, A2, A3 . . . , B1, B2, B3 . . . , and C1, C2, C3 . . . . The process begins by analyzing the pixel A1 in the bottom left corner of image and comparing the change of each of R, G, B, H, S, and/or V for each pixel A2, B1, B2 adjacent to A1. The comparison process continues, moving across the image and calculating the change of R, G, B, H, S, and/or V for each adjacent pixel not previously analyzed relative to the current pixel of interest. In other words, when analyzing pixel A2 and surrounding pixels, the change in values between A1 and A2 were calculated during analysis of A1 and surrounding pixels and need not be calculated again.

The values for R, G, B, H, S, and/or V can be, for example, 0 to 255. Each change in value is stored in bins ranging from 0 to 255. An illustrative bin 1600 is shown in FIG. 16. Accordingly, if pixel A1 has an R value of 200, and A2 has an R value of 50, the ΔR would be 150. The bin for a ΔR value of 150 would increase by one.

Once the image is analyzed, the bin is plotted to create a histogram. An illustrative histogram 1700 is shown in FIG. 17. As shown, the number of instances of little or no change between adjacent pixels is typically large, while the instances of changes of R, G, B, H, S, and/or V typically progressively decrease as the changes become more dramatic.

The inventor has found that peaks 1702 will appear where one object ends and another begins. Accordingly, adjacent pixels having a change in value in the range of the peak are considered to be along an edge. This is because an edge between two different objects will create the same color change between pixels found along that edge. The adjacent pixels having a change in value between the range 1704 of the peak 1702 can be detected during a subsequent flood fill process, can be detected by scanning data saved during analysis of the image for creating the histogram, etc.

The process may have a cutoff value 1706 for the histogram, below which any peaks are not considered. For example, the cutoff value 1706 can be a value between 1 and 50. Typically, the portion of the histogram 1700 below the cutoff value 1706 primarily reflects noise in the image. This process works with any type of image or scene.

Yet another way to identify at least some of the objects in the image frames of a sequence of frames, e.g., a movie, is to use motion-based detection. In this process, changes in position of pixels relative to other pixels indicate that an object is moving. By noting which pixels move and which are stationary from frame to frame, the moving object can be identified. Motion-based detection may also be used to verify and refine the objects detected using one of the other methods described previously.

Now the objects in the image are identified. Missing pixels in the objects can be filled in, in a manner similar to the way the shadowed pixels are matched to the edges.

Figure 18:
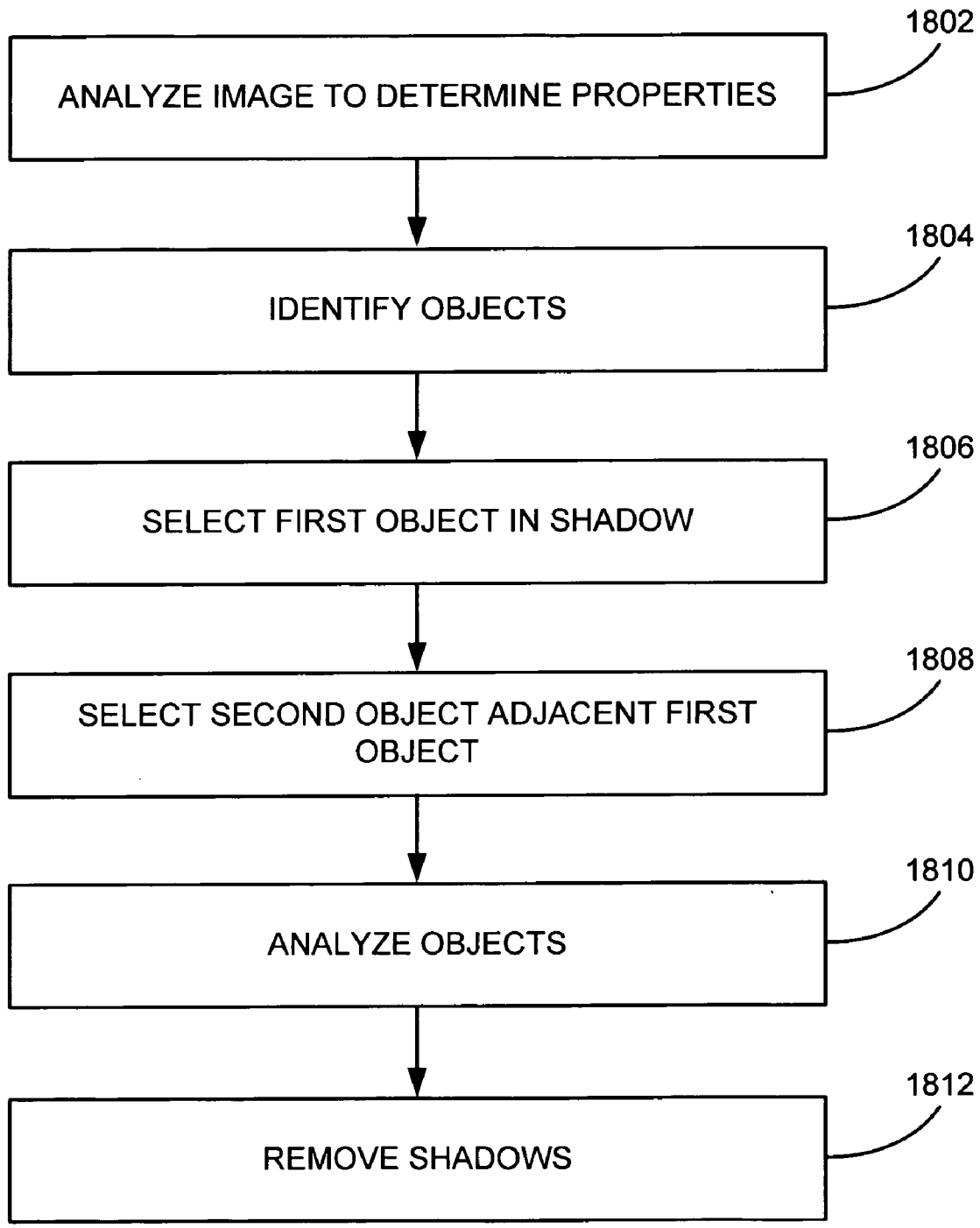
FIG. 18 is flow diagram of a process for determining which objects are in the same overall object and removing shadows.

The present invention also provides the capability to accurately determine which pixels are in the same overall object, whether they are in shadow or not, as well as remove shadows from images. FIG. 18 illustrates a process 1800 for determining which objects are in the same overall object and removing shadows. In operation 1802, the image is analyzed for determining its properties. In operation 1804, objects in the image are identified based at least in part on the properties of the image. In operation 1806, a first object of the image that is at least primarily in shadow is selected. In operation 1808, a second object adjacent the first object is selected. In operation 1810, the two objects are analyzed using the properties of the image for determining whether the two objects are part of a same overall object.

Thus, if two objects border each other, the pixels are adjacent, and one or more (preferably all) of the following are true, then the two objects are considered to be in the same overall object.

- The ratio (Rratio) of the average R value of pixels in shadow to the average R value of the pixels not in shadow is less than 1.
- The ratio (Gratio) of the average G value of pixels in shadow to the average G value of the pixels not in shadow is less than 1.
- The ratio (Bratio) of the average B value of pixels in shadow to the average B value of the pixels not in shadow is less than 1.
- The ratio of average S of the pixels in shadow to average S of the pixels not in shadow is much higher than 1, e.g., 1.5 or higher.
- The ratio of average V of the pixels in shadow to average V of the pixels not in shadow is much less than 1, e.g., 0.5 or lower.
- The ratio of Bratio to Gratio is greater than or equal to 1. This is because, when go into shadow, the blue does not drop off as quickly as the green.
- The ratio of Gratio to Rratio is greater than or equal to 1. This is because, when go into shadow, the green does not drop off as quickly as the red.

The user can be presented with options to select how much greater or less than 1 some or all of the above-defined ratios much be, thereby determining how aggressively the program matches shadowed and nonshadowed objects.

Now that it is known which objects are in the same overall object, and having determined the ratios, the shadow can be removed from the shadowed object (portion of the overall object) in optional operation 1812 by changing the pixel properties based on the ratios. For example, multiply the R value of a pixel in shadow by 1/Rratio to get a new R value (Rnew) that does not appear to be in shadow.

Likewise, new green and blue values can be calculated for pixels in shadow by multiplying the G and B values by Gratio and Bratio, respectively. The resulting overall object will appear to not have a shadow cast on it. Note that the RGB ratios can be based on RGB values of all pixels in each object, or subsets of the pixels.

As opposed to removing the shadow, the user can also lighten and darken shadows on an object-by-object basis or in the overall image by adjusting the ratios used to calculate the new RGB values for the shadowed pixels. The user can also be allowed to manipulate the R, G, B, H, S and/or V values of the shadowed object portion of the overall object to further refine the image. The user can also be presented with a screen that shows the identified objects, and the user can select from which objects to remove or alter shadows.

Many of the features described herein can be tuned and/or turned on and off by the user. For example, the shadow edge softening can be turned off if desired.

Note also that the processes described herein, or portions thereof, may also be incorporated in an image processing software product. An image processing software product according to an embodiment provides one or more of the following features:

Slide show and movie output

Movie mode

Cross-compatibility with existing software products

Batch processing of images

Image labeling

Image search

Matching color schemes across images

Color replacement for changing a color of selected portions of an image

Shadow and highlight correction for improving the contrast of over- or underexposed areas of an image Photo touch-up including removal of redeye, dust, scratches, blemishes, wrinkles, and other flaws Dimensional effects such as image wrapping, stretching, curling, bending Remove image blurring Correct lens distortion Image noise reduction Crop and straighten Compositing of 2D objects Painting and drawing tools Addition of text and labels Creation of animations Multi-level undo feature The image processing software may include menu options to find shadows, as well as allow the user to define how aggressively to find shadows. Other options presented by the image processing software may include allowing the user to define properties of shadows such as darken shadows, lighten shadows, etc. e.g., by presenting a slider to darken or lighten shadows. A field may also allow the user to set percentage of shadow shown, e.g., 50% lighter.

The features and processes described herein can also be used in conjunction with software and hardware for automatic compositing of 3D objects in a still frame or series of frames, as described in copending US Patent Application entitled "Automatic Compositing of 3D Objects In a Still Frame or Series of Frames," filed Oct. 28, 2005 under Ser. No. 11/262,262, and which is herein incorporated by reference.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for identifying pixels in shadow in an image, comprising:

analyzing an image for determining several properties thereof, the properties including hue (H), saturation (S), brightness (V), red color content (R), green color content (G), and blue color content (B);

creating a first histogram of H/S values calculated for each pixel in the image;

creating a second histogram of S/V values calculated for each pixel in the image;

identifying a line feature in the first histogram;

identifying a line feature in the second histogram; and marking pixels having an H/S value above the line feature in the first histogram and an S/V value above the line feature in the second histogram as being in shadow.

2. A method as recited in claim 1, further comprising storing leveling data, wherein the finding the objects in the image uses the leveling data.

3. A method as recited in claim 1, further comprising smoothing the image and detecting edges in the image.

4. A method as recited in claim 1, further comprising detecting edges in the image and refining lines based on the detected edges in the image.

5. A method as recited in claim 1, further comprising detecting edges in the image and adjusting a boundary of the detected shadows in the image based on a proximity to the detected edges.

6. A method as recited in claim 1, wherein marking the pixels as being in shadow further comprises:

flagging pixels having an H/S value below the line feature in the first histogram as potentially not being in shadow;

flagging pixels having an H/S value above the line feature in the first histogram as potentially being in shadow;

flagging pixels having an S/V value below the line feature in the second histogram as potentially not being in shadow;

flagging pixels having an S/V value above the line feature in the second histogram as potentially being in shadow; and marking pixels having two flags as being in shadow.

7. A method as recited in claim 1, wherein the method is performed for a series of images.

8. A computer program product, comprising:

a computer readable medium having computer code thereon for processing an image, the computer code including:

computer code for analyzing an image for determining several properties thereof, the properties including hue (H), saturation (S), brightness (V), red color content (R), green color content (G), and blue color content (B);

computer code for creating a first histogram of H/S values calculated for each pixel in the image;

computer code for creating a second histogram of S/V values calculated for each pixel in the image;

computer code for identifying a line feature in the first histogram;

computer code for identifying a line feature in the second histogram; and computer code for marking pixels having an H/S value above the line feature in the first histogram and an S/V value above the line feature in the second histogram as being in shadow.

9. A computer program product, comprising:

a computer readable medium having computer code thereon for processing an image, the computer code including:

computer code for generating slide show and movie output;

computer code for performing batch processing of an image;

computer code for allowing image labeling;

computer code for matching color schemes across multiple images;

computer code for performing color replacement for changing a color of selected portions of an image;

computer code for performing shadow and highlight correction for improving contrast of over- or underexposed areas of an image;

computer code for performing photo touch-up functions including removal of redeye, dust, scratches, blemishes, wrinkles;

computer code for performing dimensional effects on an image including image wrapping, stretching, curling, and bending;
computer code for removing image blurring;
computer code for correcting lens distortion;
computer code for image noise reduction;
computer code for cropping and straightening an image;
computer code for providing painting and drawing tools;
computer code for addition of text and labels;
computer code for manipulating shadows in an image; and
computer code for identifying which pixels in an image are in shadow by determining properties of an image including hue (H), saturation (S), and brightness (V); wherein determining which pixels of the image are in shadow further comprises creating a first histogram of H/S values calculated for each pixel in the image; creating a second histogram of S/V values calculated for each pixel in the image; identifying a line feature in the first histogram; identifying a line feature in the second histogram; and marking pixels having an H/S value above the line feature in the first histogram and an S/V value above the line feature in the second histogram as being in shadow.

10. A method for manipulating shadows of an image, comprising:
analyzing an image for determining several properties thereof;
determining which pixels of the image are in shadow; and
performing at least one of shadow boundary adjustment and shadow boundary softening of the image for a group of pixels determined to be in shadow, an outer periphery of the pixels determined to be in shadow defining the shadow boundary,
wherein the properties include hue (H), saturation (S), and brightness (V);
wherein determining which pixels of the image are in shadow further comprises creating a first histogram of H/S values calculated for each pixel in the image; creating a second histogram of S/V values calculated for each pixel in the image; identifying a line feature in the first histogram; identifying a line feature in the second histogram; and marking pixels having an H/S value above the line feature in the first histogram and an S/V value above the line feature in the second histogram as being in shadow.

11. A method as recited in claim 10, further comprising detecting edges in the image and performing shadow boundary adjustment, wherein the shadow boundary adjustment includes adjusting a boundary of the group of pixels in shadow based on a proximity to the detected edges.

12. A method as recited in claim 11, wherein the proximity to the detected edge is based on a predefined number of pixels.

13. A method as recited in claim 11, wherein the proximity to the detected edge is based on a percentage of total pixels in the image.

14. A method as recited in claim 11, wherein the proximity to the detected edge is based on a percentage of horizontal pixel width of the image.

15. A method as recited in claim 11, wherein the proximity to the detected edge is based on a percentage of vertical pixel height of the image.

16. A method as recited in claim 10, wherein shadow boundary softening is performed, wherein the shadow boundary softening includes adjusting at least one of the properties of pixels along the boundary of the shadow based on a linear interpolation between properties of pixels in shadow and properties of pixels not in shadow.

17. A method as recited in claim 10, wherein shadow boundary softening is performed, wherein the shadow boundary softening includes analyzing pixels positioned towards the shadow boundary, and adjusting at least one of the properties of the pixels being analyzed based on an average of similar properties of pixels surrounding each pixel being analyzed.

18. A method as recited in claim 10, further comprising providing the following features:
slide show and movie output of multiple images,
batch processing of multiple images,
image labeling,
matching color schemes across multiple images,
color replacement for changing a color of selected portions of an image,
shadow and highlight correction for improving the contrast of over- or underexposed areas of an image
photo touch-up including removal of redeye, dust, scratches, blemishes, wrinkles,
dimensional effects including image wrapping, stretching, curling, and bending,
removing image blurring,
correcting lens distortion,
image noise reduction,
cropping and straightening an image,
painting and drawing tools, and
allowing addition of text and labels.

19. A method as recited in claim 10, wherein the method is performed for a series of images.

20. A computer program product, comprising:
a computer readable medium having computer code thereon for processing an image, the computer code including:
computer code for analyzing an image for determining several properties thereof;
computer code for determining which pixels of the image are in shadow; and
computer code for performing at least one of shadow boundary adjustment and shadow boundary softening of the image for a group of pixels determined to be in shadow, an outer periphery of the pixels determined to be in shadow defining the shadow boundary,
wherein the properties include hue (H), saturation (S), and brightness (V);
wherein determining which pixels of the image are in shadow further comprises creating a first histogram of H/S values calculated for each pixel in the image; creating a second histogram of S/V values calculated for each pixel in the image; identifying a line feature in the first histogram; identifying a line feature in the second histogram; and marking pixels having an H/S value above the line feature in the first histogram and an S/V value above the line feature in the second histogram as being in shadow 21. A method for identifying an object in an image, comprising:
analyzing an image for determining several properties thereof;
finding objects in the image based at least in part on the properties of the image;
selecting a first object determined to be at least primarily in shadow;

selecting a second object adjacent the first object;

analyzing the two objects using the properties of the image for determining whether the two objects are part of a same overall object, wherein the properties include hue (H), saturation (S), and brightness (V);

wherein selecting a first object determined to be at least primarily in shadow further comprises creating a first histogram of H/S values calculated for each pixel in the image; creating a second histogram of S/V values calculated for each pixel in the image; identifying a line feature in the first histogram; identifying a line feature in the second histogram; and marking pixels having an H/S value above the line feature in the first histogram and an S/V value above the line feature in the second histogram as being in shadow.

22. A method as recited in claim 21, wherein the objects in the image are found using a flood fill algorithm.

23. A method as recited in claim 21, wherein the objects in the image are found using a histogram.

24. A method as recited in claim 21, wherein the method is performed for a series of images.

25. A method as recited in claim 24, wherein at least some of the objects in the image are found using motion-based detection.

26. A method as recited in claim 21, wherein the second object is not in shadow.

27. A method as recited in claim 21, wherein analyzing the two objects includes:

comparing a ratio of an average red (R) value of pixels in the first object to an average R value of pixels in the second object against a predetermined value;

comparing a ratio of an average green (G) value of pixels in the first object to an average G value of pixels in the second object against a predetermined value;

comparing a ratio of an average blue (B) value of pixels in the first object to an average B value of pixels in the second object against a predetermined value;

comparing a ratio of an average saturation (S) value of the first object to an average S value of the second object against a predetermined value;

comparing a ratio of an average brightness (V) value of the first object to an average V value of the second object against a predetermined value;

wherein if the comparisons of the ratios to the predetermined values match predefined criteria, the first and second objects are determined to be in the same overall object.

28. A computer program product, comprising:

a computer readable medium having computer code thereon for processing an image, the computer code including:

computer code for analyzing an image for determining several properties thereof;

computer code for finding objects in the image based at least in part on the properties of the image;

computer code for determining whether one of the objects of the image is at least primarily in shadow;

computer code for selecting a first object determined to be at least primarily in shadow;

computer code for selecting a second object adjacent the first object;

computer code for analyzing the two objects using the properties of the image for determining whether the two objects are part of a same overall object, wherein the properties include hue (H), saturation (S), and brightness (V);

wherein selecting a first object determined to be at least primarily in shadow further comprises creating a first histogram of H/S values calculated for each pixel in the image; creating a second histogram of S/V values calculated for each pixel in the image; identifying a line feature in the first histogram; identifying a line feature in the second histogram; and marking pixels having an H/S value above the line feature in the first histogram and an S/V value above the line feature in the second histogram as being in shadow.

29. A method for removing shadows from an image, comprising:

analyzing an image for determining several properties thereof;

finding objects in the image based at least in part on the properties of the image;

selecting a first object determined to be at least primarily in shadow;

selecting a second object adjacent the first object, the second object not being primarily in shadow;

analyzing the two objects using the properties of the image for determining whether the two objects are part of a same overall object;

calculating new red (R) values for pixels in the first object based on a ratio of an average R value of the pixels in the first object to an average R value of pixels in the second object;

calculating new green (G) values for pixels in the first object based on a ratio of an average G value of the pixels in the first object to an average G value of pixels in the second object; and calculating new blue (B) values for pixels in the first object based on a ratio of an average B value of the pixels in the first object to an average B value of pixels in the second object, wherein selecting a first object determined to be at least primarily in shadow further comprises creating a first histogram of H/S values calculated for each pixel in the image; creating a second histogram of S/V values calculated for each pixel in the image; identifying a line feature in the first histogram; identifying a line feature in the second histogram; and marking pixels having an H/S value above the line feature in the first histogram and an S/V value above the line feature in the second histogram as being in shadow.

30. A method as recited in claim 29, wherein the objects in the image are found using a flood fill algorithm.

31. A method as recited in claim 29, wherein the objects in the image are found using a histogram.

32. A method as recited in claim 29, wherein the method is performed for a series of images.

33. A method as recited in claim 32, wherein at least some of the objects in the image are found using motion-based detection.

34. A method as recited in claim 29, further comprising allowing user manipulation of a hue (H) of the first object.

35. A method as recited in claim 29, further comprising allowing user manipulation of a saturation (S) of the first object.

36. A method as recited in claim 29, further comprising allowing user manipulation of a brightness (V) of the first object.

37. A computer program product, comprising:

a computer readable medium having computer code thereon for processing an image, the computer code including:

computer code for finding objects in the image based at least in part on the properties of the image;

computer code for determining whether one of the objects of the image is at least primarily in shadow;

computer code for selecting a first object determined to be at least primarily in shadow;

computer code for selecting a second object adjacent the first object, the second object not being primarily in shadow;

computer code for analyzing the two objects using the properties of the image for determining whether the two objects are part of a same overall object;

computer code for calculating new red (R) values for pixels in the first object based on a ratio of an average R value of the pixels in the first object to an average R value of pixels in the second object;

computer code for calculating new green (G) values for pixels in the first object based on a ratio of an average G value of the pixels in the first object to an average G value of pixels in the second object; and calculating new blue (B) values for pixels in the first object based on a ratio of an average B value of the pixels in the first object to an average B value of pixels in the second object wherein selecting a first object determined to be at least primarily in shadow further comprises creating a first histogram of H/S values calculated for each pixel in the image; creating a second histogram of S/V values calculated for each pixel in the image; identifying a line feature in the first histogram; identifying a line feature in the second histogram; and marking pixels having an H/S value above the line feature in the first histogram and an S/V value above the line feature in the second histogram as being in shadow.

* * * * *

UNITED STATES PATENT AND TRADEMARK OFFICE
CERTIFICATE OF CORRECTION

PATENT NO. : 7,305,127 B2
APPLICATION NO. : 11/271532
DATED : December 4, 2007
INVENTOR(S) : Barton S. Wells Page 1 of 1

It is certified that error appears in the above-identified patent and that said Letters Patent is hereby corrected as shown below:

In the specification:
col. 7, line 66 change "(colunms)" to --(columns)--.

In the claims:
col. 18, line 59 change "as being in shadow" to --as being in shadow.--;
col. 22, line 6 change "in the second object" to --in the second object,--.

Signed and Sealed this

Twentieth Day of May, 2008

JON W. DUDAS
*Director of the United States Patent and Trademark Office*